US011299164B2

(12) United States Patent
Kriesche et al.

(10) Patent No.: US 11,299,164 B2
(45) Date of Patent: Apr. 12, 2022

(54) METHOD AND DEVICE FOR GENERATING A SIGNAL WARNING OF SLIPPERINESS ON A ROADWAY

(71) Applicant: Boschung Mecatronic AG, Payerne (CH)

(72) Inventors: Thomas Kriesche, Mannheim (DE); Michel Decrevel, Matran (CH)

(73) Assignee: Boschung Mecatronic AG, Payerne (CH)

( * ) Notice: Subject to any disclaimer, the term of this patent is extended or adjusted under 35 U.S.C. 154(b) by 0 days.

(21) Appl. No.: 16/644,220

(22) PCT Filed: Sep. 6, 2017

(86) PCT No.: PCT/EP2017/072355
§ 371 (c)(1),
(2) Date: Mar. 4, 2020

(87) PCT Pub. No.: WO2019/048037
PCT Pub. Date: Mar. 14, 2019

(65) Prior Publication Data
US 2020/0198642 A1     Jun. 25, 2020

(51) Int. Cl.
*B60W 40/06*     (2012.01)
*B60W 50/14*     (2020.01)
(Continued)

(52) U.S. Cl.
CPC ............ *B60W 40/06* (2013.01); *B60W 50/14* (2013.01); *G01N 21/359* (2013.01); *G08B 19/02* (2013.01); *B60W 2420/403* (2013.01)

(58) Field of Classification Search
CPC . G08B 19/02; B60T 2210/12; B60T 2210/13; B60W 40/068; B60W 40/064;
(Continued)

(56) References Cited

U.S. PATENT DOCUMENTS 3,229,271 A * 1/1966 Frant .................. G08B 19/02
340/581
5,218,206 A * 6/1993 Schmitt ............... B60R 16/0237
250/339.1
(Continued)

FOREIGN PATENT DOCUMENTS

CH            653134         12/1985
DE           19506550        8/1996
(Continued)

OTHER PUBLICATIONS

"Infrared deflectometry for the inspection of diffusely specular surfaces" Adv. Opt. Techn. 2016; 5(5-6): 377-387 to Burke et al. (Burke) (Year: 2016).*
(Continued)

*Primary Examiner* — Kenneth J Malkowski
(74) *Attorney, Agent, or Firm* — Wolf, Greenfield & Sacks, P.C.

(57) ABSTRACT

A method and a device for generating a signal which indicates the imminent formation of slipperiness on a roadway (2) before this arises on the roadway, wherein radiation reflected from the roadway, or from a point adjacent to the roadway, is evaluated, which radiation emanates from at least one reference surface (11) arranged in or on the roadway or the adjacent point, which reference surface is formed by a material different from the roadway covering material. The reference surface is selected from a material on which slipperiness is formed earlier than on the road surface material. The signal (13) is emitted when the evaluation shows that slipperiness has formed on the reference surface (11).

26 Claims, 2 Drawing Sheets

(51) Int. Cl.
*G01N 21/359* (2014.01)
*G08B 19/02* (2006.01)

(58) Field of Classification Search
CPC ..... B60W 40/06; G06K 9/2018; G01N 21/55; G01N 21/359
See application file for complete search history.

(56) References Cited

U.S. PATENT DOCUMENTS

| | | | | |
|---|---|---|---|---|
| 2006/0076495 | A1* | 4/2006 | Dupont | G08G 1/161 |
| | | | | 250/339.11 |
| 2015/0120093 | A1* | 4/2015 | Renno | G01N 21/55 |
| | | | | 701/3 |

FOREIGN PATENT DOCUMENTS

| | | |
|---|---|---|
| EP | 1635163 | 3/2006 |
| WO | 9114170 | 9/1991 |

OTHER PUBLICATIONS

Corrosion of metals, available at https://xapps.xyleminc.com/Crest.Grindex/help/grindex/contents/Metals.htm (Year: 2016).*
International Search Report No. PCT/EP2017/072355, dated May 3, 2018 and completed Apr. 24, 2018.

* cited by examiner

METHOD AND DEVICE FOR GENERATING A SIGNAL WARNING OF SLIPPERINESS ON A ROADWAY

CROSS REFERENCE TO RELATED APPLICATIONS

This application is a § 371 national stage of PCT International Application No. PCT/EP2017/072355, filed Sep. 6, 2017 which is incorporated herein in its entirety by this reference.

SUBJECT MATTER OF THE INVENTION

The invention relates to a method for generating a signal warning of slipperiness on a road surface. Furthermore, the invention concerns a device for generating a signal warning of slippery road surfaces.

BACKGROUND

Slippery frost or freezing slippery surfaces lead to a drastic reduction in grip between a road surface and the tyres of a vehicle. Since such slipperiness occurs in the absence of precipitation, this danger is not apparent to a driver. Slipperiness, in particular so-called slippery frost, or the formation of a layer of ice or the growth of ice crystals on a cooled surface, is caused by the phase transition from water vapour condensed from moist air to solid matter. In contrast to the formation of ice by freezing surface water, no precipitation event must have preceded this process. The actual formation of slipperiness depends on several parameters, whereby soil and air temperature, dew point, relative humidity, solar radiation, wind speed, soil morphology and the possible presence of fog play a role. It has been shown for roads that, especially in the morning hours on cold and humid days, a temporary and locally limited slipperiness occurs. If the air is heated by the first rays of sunlight close to ground or vegetation, the air has a higher water absorption capacity and warms the surface water. Different morphological landscape structures and different soil and plant distribution can cause air circulation near the ground to the roadway or street, on which frost or ice formation takes place on the surface which is cooled down by the night-time temperatures. Bridges cool down more at night due to the lack of insulating layers of earth and thus particularly form the basis for localized areas where frost or ice formation can take place. But roads near water-rich areas are also at risk. It is only with continuous exposure to sunlight that frost/ice layers are broken down by solar heat radiation.

It is known that the condition of the road surface with regard to dryness, wetness or icing can be determined contactlessly by measuring the reflection of light in the infrared range, for which, for example, reference can be made to WO 91/14170. This reflection measurement of the road surface, which is known to the skilled person, has proven itself, but only determines the actual condition.

DISCLOSURE OF THE INVENTION

The invention has the objective of being able to detect the danger of the formation of slippery frost or over-freezing so early and safely that an effective warning of the traffic or the timely use of gritting vehicles is possible. This should be possible as universally as possible, without having to make assumptions or set parameters specific to the location, which are only valid for the respective location.

This objective is solved by the fact that in order to generate a signal indicating the imminent or future formation of slipperiness on a roadway before it actually occurs on the roadway, radiation reflected from the roadway, or from a point adjacent to the roadway, is evaluated, which originates from at least one reference interface arranged in or on the roadway or the adjacent point, formed of a material different from the pavement material, which is selected from a material on which the slipperiness develops earlier than on the pavement material, and wherein a signal is emitted when the evaluation shows that slipperiness has developed on the reference surface.

Since the slipperiness is formed earlier on the reference surface than on the surface of the pavement material, the detection of slipperiness on the reference surface can generate a signal that indicates the formation of slipperiness before it even occurs on the pavement or road. This signal can trigger a warning to warn road users by means of activated traffic signs and/or navigation systems and/or mobile media devices and/or the application of de-icing agents or, if necessary, the road can be closed. Thus, an artificial surface is measured by a contactless remote measurement, which is stationary integrated in the roadway or which is arranged next to the roadway. To ensure that ice or frost slipperiness occurs earlier on this surface than on the road surface material, the material of the reference surface is selected accordingly. In addition, the material which forms the reference surface for use in the roadway must be selected so that it can be mechanically inserted into the roadway or applied on it and can withstand traffic loads, and only forms a locally limited area of the roadway so that no traffic hazard can arise from the material.

The reference surface is preferably arranged permanently in or on the roadway or street or at the point next to the roadway, as the case may be. Preferably, the reference surface is formed by the surface of a reference body which is embedded in the roadway.

Preferably, the method uses light in the infrared range, especially in the so-called near infrared range NIR (780 nm to 3000 nm) and especially in a range of about 900 nm to 2000 nm, which is evaluated as reflected radiation. Preferably, IR radiation in this range is directed to the reference surface and the radiation reflected from the reference surface is evaluated in order to detect the formation of frost or ice on the reference surface. This is preferably done by comparing the light reflected from the reference surface with stored, previously known information, in particular characteristic curves, which are characteristic for the presence of ice/rough frost on the reference surface in the used infrared range, which enables rapid detection. It is also possible, alternatively or additionally, to take an image of the reference surface in the visible range and determine the formation of slipperiness on the reference surface by evaluating the image.

Preferably, the method uses a reference surface with a diameter or a diagonal of 100 mm to 200 mm, especially up to 150 mm. The reference surface can also be formed by a coating applied to the road surface material. If, as preferred, the reference surface is formed by a body embedded in the roadway, this body has, in particular, a thickness of 5 mm to 20 mm.

In particular, the reference surface has a roughened surface, which increases the surface area, and the surface is particularly hydrophilic or water-attractive. The reference surface is reflective in the aforementioned preferred near infrared range, in particular within the range of 900 nm to 2000 nm. Preferably, the reference surface is made of metal, especially stainless steel or another non-corrosive or hardly corrosive metal. Or the reference surface can be formed by an open-porous metal foam, or the reference surface can be formed by a colour layer with a portion of metal particles and/or with a portion of polymers, which reflect near infrared.

In order to improve the reflectivity characteristics for the purposes of this method, the reference surface may comprise a partial surface which is mirror-like and which is flat and/or curved.

The invention further has the objective of creating a device by means of which a pre-warning signal can be generated for an imminent slipperiness formation on a roadway or street. The device shall be universally applicable and inexpensive.

This objective is solved with a device according to claim 14.

Since the slipperiness develops on the reference surface earlier than on the surface of the roadway or pavement material, the detection of slipperiness on the reference surface of the device can generate a signal indicating the formation of slipperiness before it occurs on the road. From this signal, the device or a superordinate traffic warning centre can generate a warning to road users via activatable traffic signs and/or navigation systems and/or mobile media devices and/or the application of de-icing agent can be triggered or, if necessary, a road closure can be initiated. In this way, the device measures a reference surface of the device by means of contactless remote measurement, which is stationary and integrated in the roadway or road, or which is arranged next to the roadway or road. The material of the reference surface is selected so that ice or frost slipperiness occurs earlier on this surface than on the road surface material or road covering material. In addition, the material forming the reference surface for use in the roadway must be selected so that it can be mechanically inserted into the roadway or applied to it and can withstand traffic loads and only forms a locally limited area of the roadway or road, so that no traffic hazard can arise from the material.

Advantageous embodiments of the device are designed according to the dependent claims. In particular, the road condition sensor is designed to emit light in the infrared range in the direction of the reference surface and to receive and evaluate the light reflected from the reference surface or to provide the received signal for evaluation. Preferably, the wavelength of the light is in the so-called near infrared range NIR (780 nm to 3000 nm) and in particular in a range from approx. 900 nm to 2000 nm. It has been noticed that ice or frost on the reference surface can be easily detected. In addition, a road condition sensor of known type which operates in such a wavelength range can be modified so that it only uses the reference surface instead of the road surface and/or that it can be used for the reference surface as well as for the detection of the condition of the road surface. The evaluation can preferably be carried out by comparing the light reflected from the reference surface with stored, previously known information, in particular characteristic curves, which are characteristic for the presence of ice/rime on the reference surface in the used infrared range. Alternatively or additionally, visible light reflected by the device from the reference surface can be evaluated, in particular by taking at least one image of the reference surface in the visible range and by the formation of slipperiness on the reference surface by evaluating the image. Furthermore, it is preferred that the reference surface is formed by the surface of a body which is embedded in the roadway or street or is arranged at a point next to the roadway or street. Such a body represents a practically infinite heat potential compared to the mass of condensing water and ensures rapid formation of frost or ice. However, the reference surface can be kept small and has a diameter or diagonal of 100 mm to 200 mm, especially up to 150 mm. Preferably, the reference surface has a roughened surface to increase its effective surface area. Furthermore, the reference surface preferably has a hydrophilic surface to attract the condensing moisture. Furthermore, it is preferred that the reference surface is made of metal, in particular stainless steel or another metal which does not or hardly corrodes at all, or wherein the reference surface is made of an open-porous metal foam, or wherein the reference surface is formed by a paint layer which is provided with a portion of metal particles and/or with a portion of polymers which reflect near infrared. Furthermore, it is preferred that the reference surface is substantially completely flat or that the reference surface comprises a partial surface which is designed to be reflective and which is designed to be flat and/or curved.

BRIEF DESCRIPTION OF THE DRAWINGS

Further embodiments, advantages and applications of the invention result from the dependent claims and from the now following description of the figures. Thereby it is shown in:

WAY(S) OF CARRYING OUT THE INVENTION

Figure 1:
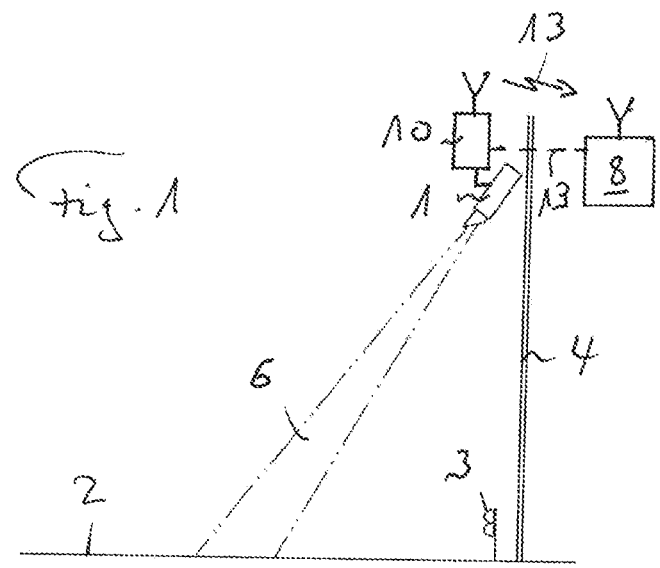
FIG. 1 schematically the arrangement of a non-contact road condition sensor in a roadway or street.

FIG. 1 shows the arrangement of a non-contact road condition sensor or street condition sensor 1 next to a roadway of a road or next to a road 2, in particular behind a crash barrier 3. The terms roadway and road are used synonymously in this application. In the example, the road condition sensor 1 is mounted on a mast 4 above the road surface, e.g. at a height of 5 to 8 metres above the road surface. In this example, the road condition sensor has an IR transmitter directed towards the roadway and an IR receiver for IR radiation reflected from the roadway, which is indicated by the light path 6. It may have an evaluation circuit, shown only symbolically as box 10, to evaluate the received IR radiation and to emit a signal 13 based on the evaluation. The received IR radiation could also be forwarded as a sensor signal of the IR receiver which has not yet been evaluated and evaluated externally, so that signal 13 is only emitted by the external evaluation. The road condition sensor 1 can be connected by wire or wireless to a traffic monitoring centre, which is also only symbolically represented as box 8, and which is located at a different location. Based on the signal 13, the warning of the road users can be given locally and/or superordinate if the signal indicates that ice or frost formation has occurred on the reference surface, which means that this will subsequently occur on the road surface with considerable probability.

The road condition sensor 1 can be a road condition sensor 1 specifically designed only for carrying out the method according to the invention. In such an embodiment, it is intended for the measurement of only a small reference surface on the roadway which is different from the road surface material. Thus, in the preferred procedure with an IR backscatter measurement, the road condition sensor 1 is focused in such a way that it essentially only receives the IR radiation emanating from the reference surface. If the road condition sensor alternatively takes and evaluates an image of the reference surface in the visible range, it is also essentially focused on the reference surface. In such a case, a second road condition sensor may be available, which detects the current condition of the actual road surface in a known way, i.e. it does not only detect the reference surface. In order to reduce the amount of equipment required, the road condition sensor 1 can also be a combined sensor, which at certain times only detects the reference surface in order to carry out the method according to the invention and at other times detects the normal road surface in order to determine in a known manner whether the road is already wet or snowy or dry. A combined road condition sensor is shown below with examples. The known measurement of the normal road surface, however, will not be explained in detail here, as it is known to the skilled person.

Figure 2:
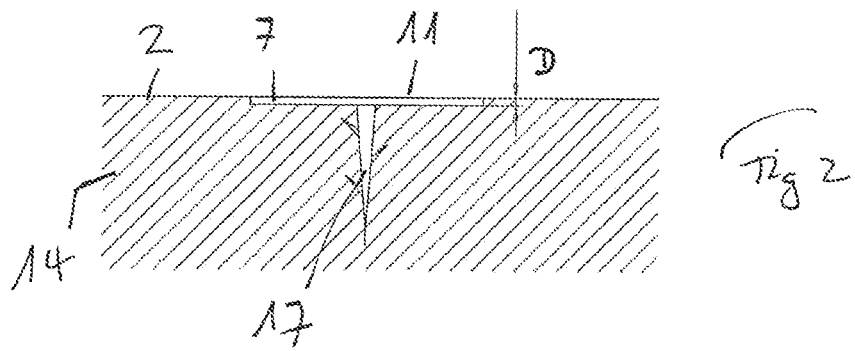
FIG. 2 a cross-section through the roadway or road surface with a body forming the reference surface.
Figure 3:
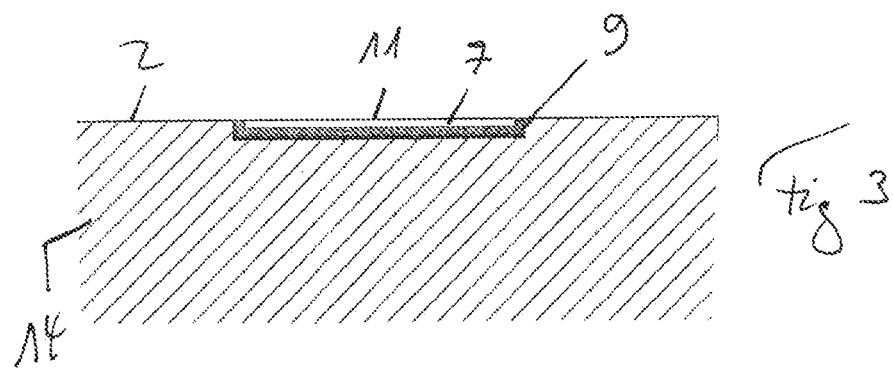
FIG. 3 a cross section of the roadway or road surface with a different design of a body forming the reference surface.

FIGS. 2 and 3 show examples of how the reference surface differs from the road surface material. In this example, the reference surface is embedded in the road surface so that it is essentially flush with the road surface. The reference surface can also be arranged at a point on the road next to the road surface or at a point next to the road.

As part of the road surface, the reference surface is designed to be traffic-bearing and not traffic-hazardous. The reference surface has preferably only a small surface and is round or angular when viewed from above. For example it has a diameter or diagonal of only 100 mm to 150 mm. This is sufficient for an IR-reflection distance measurement with a sensor 1 focused on the reference surface. In order that ice or frost slipperiness occurs earlier on the reference surface than on the road surface, the reference surface is designed in such a way that it promotes the formation of ice or frost slipperiness, which is particularly the case if it is hydrophilic and has good thermal conductivity, especially if it is more thermally conductive than the road surface. Furthermore, the reference surface should be rough in order to have a large surface. Compared to a smooth surface, a roughened surface shows an increase in the interaction layer between soil and air. Due to the hydrophilicity, air humidity condenses more on the reference surface. Because of the good thermal conductivity under the condition of a good heat coupling to the environment, the condensed water is frozen. As a result, a layer of frost or ice builds up more quickly on the reference surface than on the road surface material.

The material from which a body 7 is formed with its surface forming the reference surface 11 is preferably a metal, in particular stainless steel or another metal that does not corrode or hardly corrodes at all. There may be a portion of a material that produces a self-cleaning effect, for example a portion of $TiO_2$ nanoparticles. Even an open porous metal foam can meet the requirements of a material for the reference surface.

In the example of FIG. 2, the reference surface 11 is the upper side of a nail-shaped or T-shaped body 7 made of metal with a mandrel 17 for fixing it in the roadway. The thickness D of the head which forms the reference surface 11 can e.g. be 5 mm to 20 mm. Preferably, the pavement material 14 is excluded accordingly, to create a flush arrangement of the reference surface 11 with the surface 2 of the pavement material. In the example of FIG. 3, the reference surface 11 is formed by the upper surface of a plate-like body 7. This is embedded in the pavement material and in addition insulation 9 is provided as a thermal barrier between the pavement material and the body 7 to prevent heat flow from the pavement material to the body 7. Insulation as thermal insulation may also be provided in the example of FIG. 2.

In addition to the roughened areas, the reference surface may also include reflective or smooth areas to provide a direct reflection signal back to sensor 1. Furthermore, the reference surface may also have curved reflective areas for this purpose.

Figure 4:
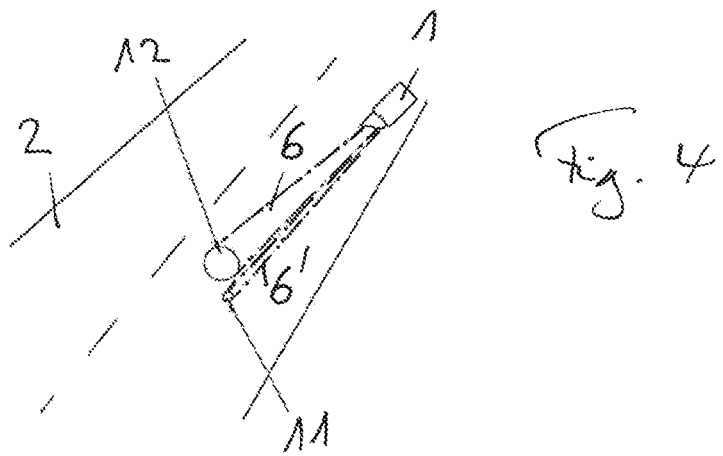
FIG. 4 schematically the arrangement of a reference surface in a roadway of a road.

When working with an IR-reflection method, it is preferable to measure the road surface in order to detect the actual state of the road in the conventional way and to carry out a measurement at the reference surface according to the invention. For this purpose the existing measuring device can e.g. be modified in such a way that it can focus on the reference surface. Such an example is shown in FIG. 4, which shows a schematic view of a part of the road 2 and the non-contact road condition sensor 1. This can be placed above the road on a pole as shown in FIG. 1. In this example it is shown that the road condition sensor 1, on the one hand, and indicated by the beam path 6, carries out the recording of the road condition in the area 12 under consideration, which is known to the skilled person, and on the other hand, and indicated by the beam path 6', carries out the recording of the reference surface 11. This can be done with an optical focusing and positioning of the measuring beams of the road condition sensor 1. For this purpose, the road condition sensor 1 has optical elements which, for example, by means of a motor, adjust the beam diameter and the position of the IR laser beams which are directed onto the road or onto the reference surface 11 and adjust the reception of the reflected IR radiation accordingly. As shown, the system changes from the known normal measuring mode with beam path 6 to beam path 6', wherein the beam path is narrowed and positioned on the reference surface 11. When the reference surface 11 is detected, its reflected IR radiation is examined to determine whether it indicates the formation of ice or frost on the reference surface 11. This can be done, for example, and preferably by comparing the received signal with stored signals which are determined for the reference surface and are characteristic for the presence of ice or frost. After this examination, it is possible to switch back to beam path 6 for measuring the road surface. The examination of the reference surface 11 can be carried out periodically or non-periodically and in particular more frequently and/or for a longer period of time at times when ice slipperiness is known to occur.

Instead of a road condition sensor with adjustable optics, an additional laser system can be arranged in the road condition sensor 1, which has the beam path 6, which permanently focuses on the reference surface 11, additionally to the known laser system. This additional laser system can be integrated in a known remote NIR road analyzer or can be arranged as a separate module on such a device.

Figure 5:
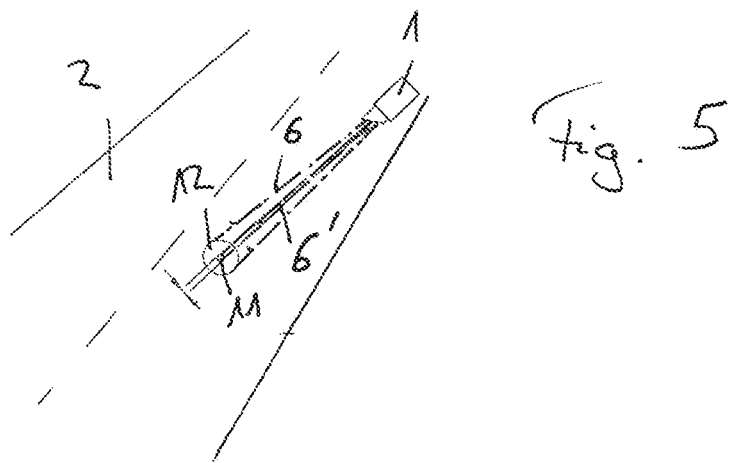
FIG. 5 schematically the reference surface within a measuring surface for measuring the pavement.

FIG. 5 shows another example where the reference area 11 is located centrally in the field of view of the usual road condition measurement with the normally considered area 12 and where survey points of the road condition sensor 1 or the remote NIR road analyzer can be shifted so that the laser survey points of the road condition sensor can be centralized and decentralized by means of positioning means or motors, so that survey points in area 12 or area 11 can be considered. This is of course also possible if the reference area 11 is not centrally located in area 12.

Figure 6:
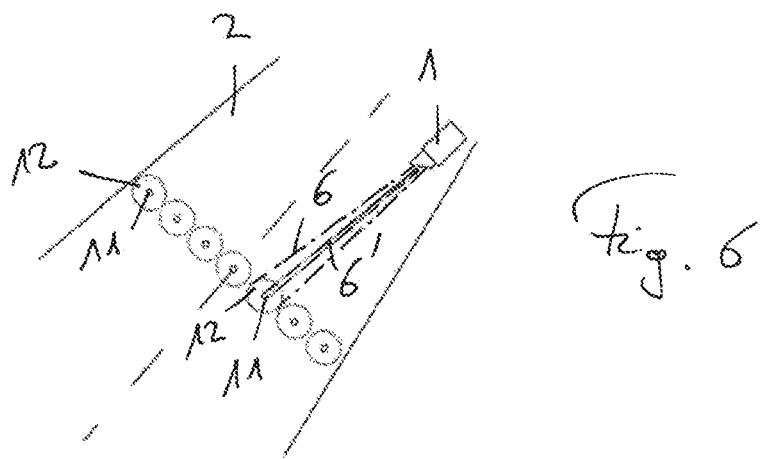
FIG. 6 schematically the arrangement of several reference surfaces on a roadway.

FIG. 6 shows a further example, where a rasterized scan of the road or street 2 is carried out, where a number of reference areas 11 are arranged in street 2. Similar to the example in FIG. 5, both an area 12 and the area of the reference surface 11 are scanned separately, wherein in this example this can be done over the entire road or over all lanes of a road.

In all examples it is possible that the reference area 11 is arranged inside the road in the usual rolling lane of the vehicle tyres or outside the road in a side strip of the road or also outside the road in an adjacent area.

The invention thus relates to a method and a device for generating a signal, which signal indicates the imminent but not yet occurred formation of slipperiness on a roadway 2, wherein radiation reflected from the roadway, or from a location adjacent to the roadway, is evaluated, which radiation emanates from at least one reference surface 11 arranged in or on the roadway or the adjacent location, which reference surface 11 is formed by a material different from the roadway covering material. The reference surface is selected from a material on which slipperiness is formed earlier than on the road surface material. The signal 13 is emitted when the evaluation shows that slipperiness has formed on the reference surface 11. Based on this signal, it is possible to warn road users of slipperiness on the road surface before it forms on the road.

While the present application describes preferred embodiments of the invention, it is clearly stated that the invention is not limited thereto and can be implemented in other ways within the scope of the following claims.

The invention claimed is:

1. A method of generating a signal indicating a condition suitable for formation of slipperiness on a roadway, the method comprising:
    using an infrared (IR) radiation source to emit IR radiation in a direction of at least one reference surface arranged in or on the roadway or arranged in or on a location adjacent to the roadway;
    receiving, by a road condition sensor, backscattered IR radiation from the at least one reference surface, the road condition sensor being oriented relative to the at least one reference surface to capture IR radiation backscattered from the at least one reference surface;
    evaluating the backscattered IR radiation from the at least one reference surface to detect a slippery condition on the at least one reference surface; and
    outputting a detection signal if the slippery condition is detected from the backscattered IR radiation,
    wherein the slippery condition forms on the at least one reference surface before the slippery condition forms on the roadway, and
    wherein the at least one reference surface is comprised of a roughened surface texture and is formed of a material different from a material forming the roadway.

2. The method according to claim 1, wherein the road condition sensor is oriented to capture substantially only IR radiation backscattered from a region of the roadway comprised of the at least one reference surface.

3. The method according to claim 1, wherein the IR radiation emitted by the IR radiation source is near infrared (NIR) radiation having a wavelength in a range of 780 nm to 3000 nm.

4. The method according to claim 1, wherein the evaluating is comprised of comparing the backscattered IR radiation from the at least one reference surface with stored information characteristic of a presence of ice/rime on the at least one reference surface in a range of wavelengths including a wavelength of the IR radiation of the IR radiation source.

5. The method according to claim 3, wherein the MP radiation has a wavelength in a range of approximately 900 nm to 2000 nm.

6. The method according to claim 1, where the at least one reference surface is permanently located in or on a surface of the roadway or the location adjacent to the roadway.

7. The method according to claim 1, wherein the at least one reference surface is comprised of a surface of a body embedded in the roadway or is arranged at a point beside the roadway.

8. The method according to claim 1, wherein the at least one reference surface has a diameter or a dimension in a range of 100 mm to 200 mm.

9. The method according to claim 1, wherein the at least one reference surface: is formed of a metal resistant to corrosion, or is formed of an open-porous metal foam, or is comprised of a paint layer that includes metal particles and/or a polymeric material configured to reflect near infrared (NIR) radiation.

10. The method according to claim 1, wherein the at least one reference surface is hydrophilic.

11. The method according to claim 9, wherein the metal forming the at least one reference surface is stainless steel.

12. The method according to claim 1, wherein the at least one reference surface is substantially flat.

13. The method according to claim 1, wherein the at least one reference surface is comprised of a portion that is reflective and that is flat and/or curved.

14. A device for generating a signal indicating a condition suitable for formation of slipperiness on a roadway, the device comprising:
    an infrared (IR) radiation source configured to emit IR radiation in a direction of at least one reference surface arranged in or on the roadway or arranged in or on a locations a road condition sensor configured to receive backscattered IR radiation from the at least one reference surface,
    the road condition sensor being configured to:
    evaluate the backscattered IR radiation to detect a slippery condition on the at least one reference surface and to output a detection signal if the slippery condition is detected from the backscattered IR radiation, or output a sensor signal for external evaluation,
    wherein the slippery condition forms on the at least one reference surface before the slippery condition forms on the roadway, and wherein the at least one reference surface is comprised of a roughened surface texture and is formed of a material different from a material forming the roadway.

15. The device according to claim 14, wherein the road condition sensor is configured to be oriented to capture substantially only IR radiation backscattered from a region of the roadway comprised of the at least one reference surface.

16. The device according to claim 14, wherein the IR radiation emitted by the IR radiation source is near infrared (NIR) radiation having a wavelength in a range of 780 nm to 3000 nm.

17. The device according to 14, wherein the road condition sensor is configured to perform an evaluation by comparing the backscattered IR radiation from the at least one reference surface with stored information comprised of data characteristic of a presence of ice/rime on the at least one reference surface in a range of wavelengths including a wavelength of the IR radiation of the IR radiation source.

18. The device according to claim 16, wherein the NIR radiation has a wavelength in a range of approximately 900 nm to 2000 nm.

19. The device according to claim 14, wherein the at least one reference surface is permanently arranged in or on a surface of the roadway or the location adjacent to the roadway.

20. The device according to 14, wherein the at least one reference surface is comprised of a body which is embedded in the roadway or is arranged at a point next to the roadway.

21. The device according to claim 14, wherein the at least one reference surface has a diameter or a dimension in a range of 100 mm to 200 mm.

22. The device according to claim 14, wherein the at least one reference surface: is formed of a metal resistant to corrosion, or is formed of an open-pore metal foam, or is comprised of a paint layer that includes metal particles and/or polymeric material configured to reflect near infrared (NIR) radiation.

23. The device according to claim 14, wherein the at least one reference surface is hydrophilic.

24. The device according to claim 22, wherein the metal forming the at least one reference surface is stainless steel.

25. The device according to 14, wherein the at least one reference surface is substantially flat.

26. The device according to claim 14, wherein the at least one reference surface is comprised of a portion that is reflective and that is flat and/or curved.

* * * * *